No. 769,595. PATENTED SEPT. 6, 1904.
T. T. & R. T. DUNN.
CHURN.
APPLICATION FILED JUNE 1, 1904.
NO MODEL. 2 SHEETS—SHEET 1.
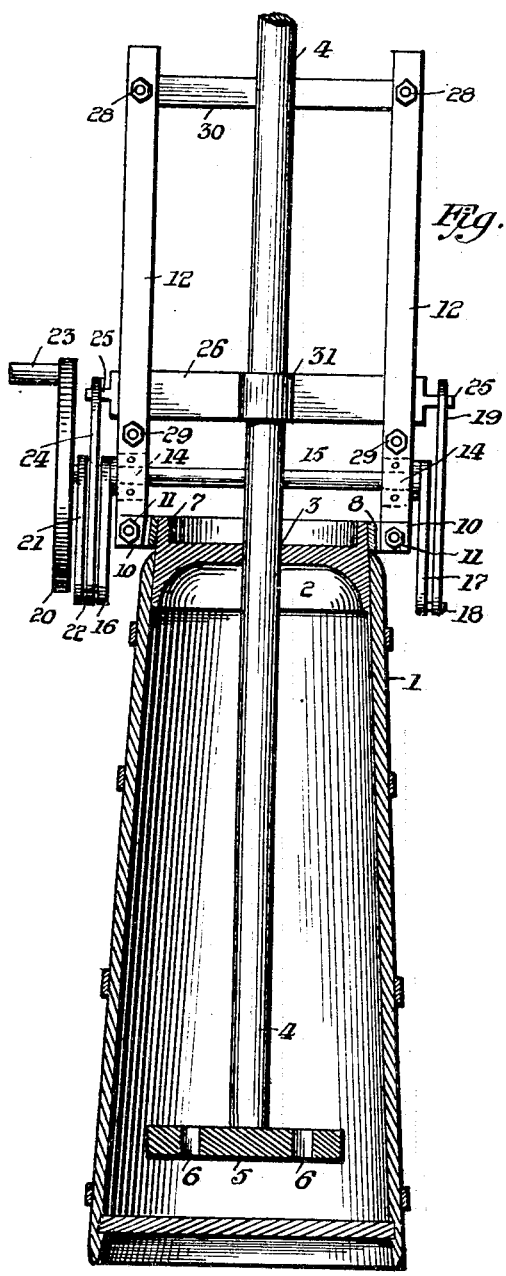
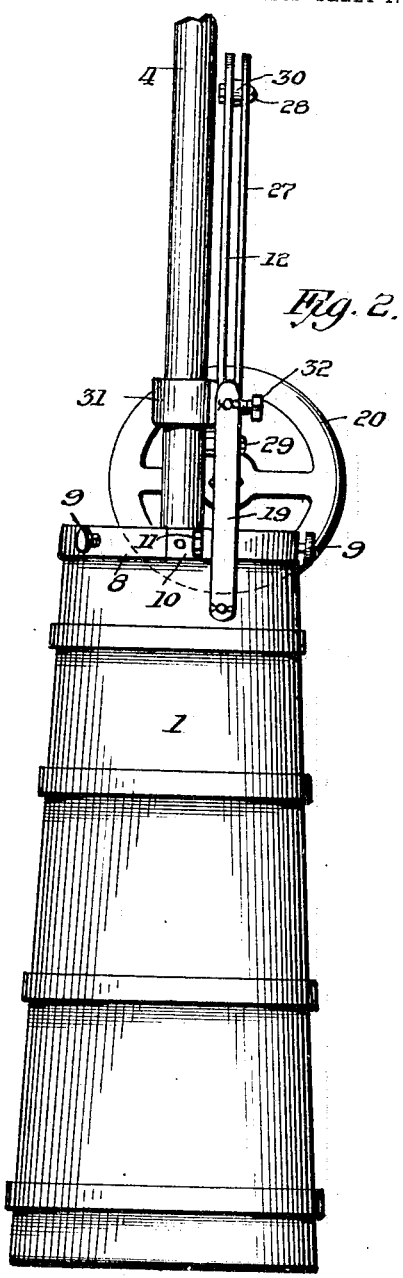
Witnesses:
H. H. Butler
E. E. Potter
Inventors,
T. T. Dunn and
R. T. Dunn,
By H. C. Evert & Co.
Attorneys.

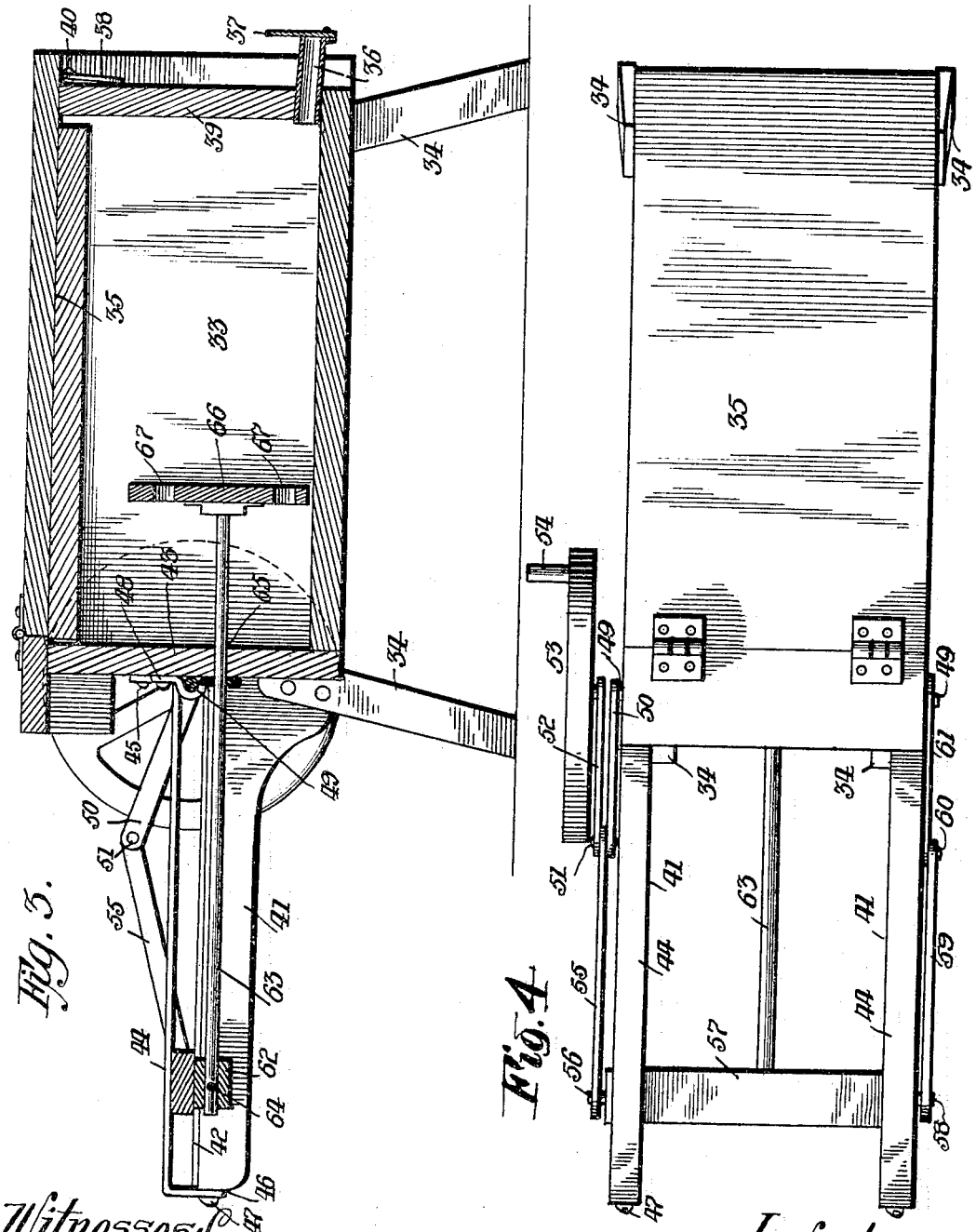

No. 769,595. Patented September 6, 1904.

UNITED STATES PATENT OFFICE.

THOMAS T. DUNN AND ROBERT T. DUNN, OF SHERIDAN, PENNSYLVANIA.

CHURN.

SPECIFICATION forming part of Letters Patent No. 769,595, dated September 6, 1904.

Application filed June 1, 1904. Serial No. 210,632. (No model.)

*To all whom it may concern:*

Be it known that we, THOMAS T. DUNN and ROBERT T. DUNN, citizens of the United States of America, residing at Sheridan, in the county of Allegheny and State of Pennsylvania, have invented certain new and useful Improvements in Churns, of which the following is a specification, reference being had therein to the accompanying drawings.

This invention has relation to churns, and more particularly to that class known as "single-reciprocating-dasher" churns, the invention having for its object the provision of novel means for reciprocating a dasher in a suitable receptacle wherein the liquid to be churned is placed.

Another object of our invention is to provide a churn of this character which will embody a construction which will be extremely simple to manufacture, strong and durable, and highly efficient when used as a churn.

The above construction will be hereinafter more fully described, and in describing the invention in detail reference will be had to the drawings accompanying this application, wherein like numerals of reference indicate like parts throughout the several views, in which—

Figure 1 is a vertical sectional view of our improved churn. Fig. 2 is a side elevation view of the same. Fig. 3 is a central longitudinal sectional view of a modified form, and Fig. 4 is a top plan view of the same.

To put our invention into practice, we employ a tub or receptacle 1, which, as illustrated in Figs. 1 and 2 of the drawings, is tapered in form, and a suitable lid or cover 2 is adapted to fit snugly within the top of the receptacle, and this lid or cover is provided with a central aperture 3, through which passes the dasher-rod 4, carrying on its lower end an annular dasher 5, having formed therein apertures 6 6. The lid or cover 2 is provided with an annular upwardly-extending flange 7, to which is secured an annular band 8 by means of set-screws 9 9, which pass through said band and engage the flange 7 of the receptacle.

The reference-numerals 10 10 indicate angle-arms which are secured to the annular band 8 by rivets, screws, or any other desired means, and secured to the angle-arms 10 by the bolts and nuts 11 11 are the upwardly-extending guide-arms 12 12, upon the rear face of which is journaled, as indicated at 14 14, the main operating-shaft 15, upon the outer ends of which are mounted crank-arms 16 and 17, and to the crank-arm 17 is pivoted, by a pin 18, a crank-lever 19. To the crank-arm 16 is secured an operating-wheel 20, this operating-wheel being provided with a crank-lever 21, which extends downwardly from the center of the wheel 20 and has its other end connected by a pin 22 to the crank-arm 16, the wheel 20 being provided with a crank-handle 23, whereby the same may be rotated. Upon the pin 22 is mounted a crank-lever 24. The upper end of this crank-lever and also the upper end of the crank-lever 19 are connected to the outwardly-extending pins 25 25 of a cross-arm 26, which is adapted to reciprocate between the guide-arms 12 and the plates 27, which are secured upon the rear face of the arms 12 12 by bolts and nuts 28 28 and 29 29, the guide-arms 12 and plates 27 being spaced apart by a cross-bar 30, which is secured near the top ends of the arms 12 and the plates 27 by the nuts and bolts 28. The cross-arm 26 is provided with a boss 31, through which passes the dasher-rod 4, and is secured in the boss by a set-screw 32, which passes through the cross-bar 26 and engages in said rod.

It will be observed by the construction of our improved churn that by rotating the wheel 20 by the crank-handle 23 the main operating-shaft 15 will be rotated and the cross-arm 26 reciprocated through the medium of the crank-levers 19 and 24, and as this cross-bar travels in the guideways formed by the arms 12 and the plates 27 the dasher-rod and dasher will be vertically reciprocated within the tub or receptacle 1.

Reference will now be had to Figs. 3 and 4 of the drawings, where we have illustrated a modified form of construction which is clearly embodied in our invention, and in this form we employ means for horizontally reciprocating the dasher-rod and dasher within a box or tub. The reference-numeral 33 indicates a suitable box or tub which is supported upon legs 34, and this box or tub is provided with a hinged lid or cover 35 and a drain pipe or spout 36, which has a gate 37 pivoted to its outer end in such a manner that the drain pipe or spout 36 may be closed or opened as the occasion necessitates. The lid or cover 35 of the box or tub is locked in a closed position by a hook 38, carried by the end 39 of the box, said hook being adapted to engage in an eye 40, carried upon the under face of the lid 35. Formed integral with the sides of the box or tub 33 are the outwardly-extending brackets 41 41, on the top edges of which are secured the guide-plates 42, and mounted upon the end 43 of the box or tub are guide-strips 44 44, which are secured thereon by screws 45, and the outer end of the guide-strips are bent downwardly, as indicated at 46, and secured to the end of the bracket by screws 47. Upon the end 43 of the box or tub are mounted brackets 48, in which is journaled a shaft 49, the ends of this shaft passing between the guide-strips 44 and the guide-plates 42, and upon the one end of the shaft is fixed a crank-lever 50, to the lower end of which is secured, by a pin 51, the crank-lever 52 of the wheel 53, said wheel being provided with a crank-handle 54, these four last-named parts being similar in construction to the wheel 20 and its connections heretofore described. Mounted upon the pin 51 is a crank-lever 55, the outer end of which is pivotally connected to a pin 56, carried upon the end of a cross-bar 57, and to the pin 58, carried by the other end of said cross-bar, is pivotally connected a lever 59, which has its other end pivotally mounted upon a pin 60, carried by the crank-arm 61, mounted upon the opposite end of the shaft 49 from that upon which the wheel 53 is carried. Centrally of the cross-bar 57 and upon its under face is mounted a block 62, in which the end of the dasher-rod 63 is secured by a pin 64, the dasher-rod extending through an aperture 65, formed in the end 43 of the box or tub, and to the end of said dasher-rod is secured a dasher-head 66, having apertures 67 67 formed therein. By revolving the wheel 53 a reciprocatory movement will be imparted to the cross-bar 57, which is slidably mounted between the guide-strips 44 and the guide-plates 42, and upon this movement being imparted to the bar 57 the dasher will be horizontally reciprocated within the tub or box, whereby any fluid which is placed therein will be churned.

While we have illustrated in the several views of the drawings different forms of a tub or receptacle, we wish it understood that we do not care to limit ourselves to the shape and form of tub or receptacle shown, but may use any other form of receptacle which will be advantageous to our invention and upon which our novel operating mechanism can be constructed and operated. It will also be noted that various changes may be made in the details of construction without departing from the scope of the invention.

What we claim is—

1. In combination with a tub or receptacle, guide-arms projecting from one end thereof, and guide-strips spaced away from the guide-arms and connected thereto, of a cross-head working between said arms and strips and provided on its ends with pins, a dasher-rod connected to the cross-head and extending into the receptacle, a dasher-head carried on the inner end of said dasher-rod, crank-levers pivotally connected at one end to the pins on the cross-head, an operating-shaft, levers connected to the ends thereof, an operating-wheel on the shaft, and a crank-lever connecting said wheel with one of the first-named crank-levers, substantially as described.

2. In a churn the combination of a tub or receptacle, a removable lid, a band embracing said lid, uprights attached to said band, a cross-head guided on said uprights, a dasher-rod secured to said cross-head, a horizontal shaft, cranks carried by said shaft, and crank-levers connected to said cranks and to said cross-head.

3. In a churn the combination of a tub or receptacle, a removable lid, a metallic band embracing said lid, vertical guide-arms attached to said band, guide-strips secured to the guide-arms and spaced apart therefrom, a cross-head working between said arms and strips and having pins on its outer ends, a dasher-rod secured to said cross-head, a horizontal shaft journaled between the guide-arms and the guide-strips, cranks carried on the outer ends of said shaft, crank-levers attached to said cranks and to the pins on the cross-head outside of the said guide-arms and guide-strips, substantially as described.

In testimony whereof we affix our signatures in the presence of two witnesses.

THOMAS T. DUNN.
ROBERT T. DUNN.

Witnesses:
H. C. EVERT,
E. E. POTTER.